(12) United States Patent
Ulanova et al.

(10) Patent No.: US 8,822,557 B2
(45) Date of Patent: Sep. 2, 2014

(54) ELASTIC INORGANIC-ORGANIC HYBRID FOAM

(75) Inventors: Tatiana Ulanova, Ludwigshafen (DE);
Horst Baumgartl, Ludwigshafen (DE);
Klaus Hahn, Kirchheim (DE)

(73) Assignee: BASF SE (DE)

( * ) Notice: Subject to any disclaimer, the term of this patent is extended or adjusted under 35 U.S.C. 154(b) by 308 days.

(21) Appl. No.: 13/503,385

(22) PCT Filed: Oct. 22, 2010

(86) PCT No.: PCT/EP2010/065926
§ 371 (c)(1),
(2), (4) Date: Apr. 23, 2012

(87) PCT Pub. No.: WO2011/051170
PCT Pub. Date: May 5, 2011

(65) Prior Publication Data
US 2012/0208910 A1    Aug. 16, 2012

(30) Foreign Application Priority Data

Oct. 27, 2009    (EP) .................................... 09174186

(51) Int. Cl.
*C08J 9/00* (2006.01)
(52) U.S. Cl.
USPC .................. 521/89; 521/91; 521/92; 521/142
(58) Field of Classification Search
USPC ........................................ 521/89, 91, 92, 142
See application file for complete search history.

(56) References Cited

U.S. PATENT DOCUMENTS

| | | | |
|---|---|---|---|
| 3,737,332 A | 6/1973 | Sennett et al. | |
| 3,850,650 A | 11/1974 | von Bonin et al. | |
| 4,464,486 A | 8/1984 | Kramer et al. | |
| 4,533,490 A | 8/1985 | Kluth et al. | |
| 5,084,101 A | 1/1992 | Engels et al. | |
| 2001/0041753 A1 | 11/2001 | Thom | |
| 2004/0231564 A1 | 11/2004 | Braun et al. | |
| 2005/0070616 A1* | 3/2005 | Champ et al. | 521/50 |
| 2008/0280126 A1 | 11/2008 | Lenz et al. | |
| 2009/0286918 A1 | 11/2009 | Stewart et al. | |
| 2011/0049411 A1 | 3/2011 | Ulanova et al. | |

FOREIGN PATENT DOCUMENTS

| | | |
|---|---|---|
| DE | 1159840 B | 12/1963 |
| DE | 2165912 A1 | 7/1973 |
| DE | 2227147 A1 | 2/1974 |
| DE | 2520079 A1 | 11/1975 |
| DE | 2630834 A1 | 3/1977 |
| DE | 3244523 A1 | 6/1984 |
| DE | 102004006563 A1 | 9/2005 |
| EP | 0417582 A2 | 3/1991 |
| EP | 1146070 A2 | 10/2001 |
| GB | 1385605 A | 2/1975 |
| GB | 1504929 A | 3/1978 |
| WO | WO-03/018476 A2 | 3/2003 |
| WO | WO-2007023118 A2 | 3/2007 |
| WO | WO-2007048729 A1 | 5/2007 |
| WO | WO-2008000623 A1 | 1/2008 |
| WO | WO-2008007187 A2 | 1/2008 |
| WO | WO-2009133046 A1 | 11/2009 |

OTHER PUBLICATIONS

International Search Report for PCT/EP2010/065926 mailed Feb. 18, 2011.
International Preliminary Report on Patentability for PCT/EP2010/065926 mailed Jan. 11, 2012.
Translation of International Preliminary Report on Patentability for PCT/EP2010/065926 dated Jun. 1, 2012.
WO 2007/048729A1 Translation (originally submitted on Apr. 17, 2012).

* cited by examiner

*Primary Examiner* — Irina S Zemel
(74) *Attorney, Agent, or Firm* — Drinker Biddle & Reath LLP

(57) ABSTRACT

A process for the production of a resilient foam by foaming a mixture, comprising
  from 50 to 97% by weight of an aqueous dispersion A) of $SiO_2$ particles which have a mean particle diameter in the range from 1 to 100 nm,
  from 1 to 45% by weight of a polymer B) dissolved in water
  from 1 to 50% by weight of a blowing agent C)
  from 1 to 5% by weight of an emulsifier D)
  from 0 to 5% by weight of a crosslinking agent E) reactive with the polymer B),
and the foam obtainable by the process and the use thereof.

17 Claims, No Drawings

ELASTIC INORGANIC-ORGANIC HYBRID FOAM

CROSS-REFERENCE TO RELATED APPLICATIONS

This application is a national stage application (under 35 U.S.C. §371) of PCT/EP2010/065926, filed Oct. 22, 2010, which claims benefit of European application 09174186.8, filed Oct. 27, 2009.

The invention relates to a process for the production of a resilient foam and to the foam obtainable by the process and to the use thereof.

Organic foams based on polystyrene, polyolefins or polyurethanes are frequently used for heat insulation. However, these are readily flammable and combustible without addition of flameproofing additives. Owing to their generally closed-cell structure, they have poor sound absorption.

Construction materials comprising light inorganic particles, such as perlite and vermiculite or alkali metal silicates are known. In general, inorganic binders, such as cement, clay or lime, are used for bonding the particles. Although the substances are distinguished by advantageous fire properties, the density is generally too high (100-1000 g/l) so that, owing to their high coefficient of thermal conductivity, they do not have a major effect as heat insulation materials (e.g. DE 2630834). On reducing the amount of binder, lower densities are obtained but the mechanical strength then decreases very sharply. It has also already been proposed (DE1159840) to use organic binders, such as asphalt, bitumen, starch or polyvinyl alcohol and acrylate polymers. Such construction materials have a good heat insulation power but do not meet the noncombustibility requirements (EN ISO 1182 or EN ISO 1716).

Owing to their chemical composition, melamine-formaldehyde foams already have advantageous fire properties. In order to improve the fire properties, the cell skeleton of open-cell melamine resin foams is impregnated, for example, with an ammonium salt (EP-A 1 146 070) or sodium silicate (WO 2007/023118).

DE-A 21 65 912 describes a process for the production of foams, in which aqueous silicate solutions are foamed together with acid-eliminating curing agents with the aid of volatile organic blowing agents and are cured. The density of the open-cell foams varies from 20 to 900 g/l.

DE-A 32 44 523 describes the production of in situ foams, an alkali metal silicate solution being mixed with a curing agent solution and a volatile liquid blowing agent under pressure. Acid-eliminating carboxylates are used as curing agents.

U.S. Pat. No. 3,737,332 describes a closed-cell foam of high density which can be obtained by blowing of air into an alumina suspension and subsequent drying and calcination at temperatures in the range from 540 to 1500° C. The closed-cell nature is achieved by stabilizing the alumina suspension by fatty acid amides. In order to fix the clay particles in the cell walls and to make the foam more stable, calcination is then effected at high temperatures.

The abovementioned inorganic silicate-based foams are of course flame retardant. However, they have as a rule a relatively high density and brittleness and poor sound absorption properties.

WO 03/018476 describes a resilient inorganic foam having a density of less than 25 kg/m³ and based on an aluminosilicate with a molar $SiO_2:Al_2O_3$ ratio of from 20:1 to 1:1. The high proportion of salt leads to chain termination reactions in the preparation and the mechanical stability is, however, still insufficient. The elongation at break is less than 1% for the foam.

WO 2007/048729 describes a low-sodium silicate foam having a density of less than 25 kg/m³ for heat or sound insulation. The open-cell foam is obtained by mixing a dispersion of $SiO_2$ particles, which have a mean particle diameter in the range from 1 to 100 nm, with a surfactant and a blowing agent at temperatures below 50° C. and foaming the mixture by heating to a temperature in the range from 60 to 100° C. or by depressurizing. The mechanical stability of the foam is achieved by a sintering process at temperatures above 200° C.

WO 2008/000623 proposes carrying out a partial hydrolysis of colloidal $SiO_2$ particles with alkali metal hydroxide for improving the foamability.

Inorganic flexible foams of low density are of interest for many applications owing to their high thermal stability, noncombustibility and low readily volatile fractions. However, the foams proposed to date do not yet show the desired resilience for many applications.

DE 10 2004 006 563 A1 describes a process for the production of organic-inorganic hybrid foams, in which an amorphous aluminosilicate is foamed with a surfactant with addition of an organic silicon compound and cured with an alkali metal silicate solution as a curing agent for the aluminosilicate. Peroxides or aluminum are used as foaming agents. The hybrid foams are set to exhibit reduced water absorption, increased abrasion resistance and better sound absorption.

WO 2008/007187 describes a hybrid material comprising a foamed polymer, in particular polyurethane, and an inorganic binder, such as gypsum or cement, having good thermal and acoustic insulation effect, water vapor permeability, good fire behavior and good adhesion on concrete and mortar.

It was therefore the object of the invention to provide a noncombustible foam which, in addition to good heat and sound absorption properties, is distinguished by improved resilience and can therefore be easily handled and processed. Furthermore, the process for the production of the foam should permit sufficient mechanical strength even without an energy-intensive sintering step.

Accordingly, a process for the production of a foam by foaming a mixture, comprising from 50 to 97% by weight, preferably from 60 to 80% by weight, particularly preferably from 40 to 70% by weight, of a clay mineral A), from 1 to 45% by weight, preferably from 1 to 15% by weight, particularly preferably from 2 to 8% by weight, of a polymer B) dissolved in water from 1 to 50% by weight, preferably from 5 to 40% by weight, particularly preferably from 20 to 35% by weight, of a blowing agent C)

from 1 to 5% by weight, preferably from 2 to 3% by weight, of an emulsifier D)

from 0 to 5% by weight, preferably from 0.1 to 1% by weight, of a crosslinking agent E) reactive with the polymer B)

was found. The percentages by weight of the components A) and B) dissolved or dispersed in water are based on the solid of these components.

A preferred process for the production of a foam according to the invention comprises the stages:

(a) preparation of a suspension from the clay mineral A) and the aqueous solution of the polymer B), (b) addition of a blowing agent C) and of an emulsifier D), (c) addition of a crosslinking agent E) reactive with the polymer B), (d) foaming of the mixture obtained after stage (c) by warming to a temperature in the range from 35 to 100° C. or by depressurization.

Suitable clay minerals A) are, for example, kaolin, silicates, such as aluminum silicate, sulfates, such as calcium sulfate, in particular allophane Al2[SiO5]&O3.nH2O, kaolinite Al4[(OH)8|Si4O10], halloysite Al4[(OH)8|Si4O10].2H2O, montmorillonite (smectite) (Al,Mg,Fe)2[(OH2|(Si,Al)4O10].Na0.33(H2O)4, vermiculite Mg2(Al,Fe,Mg)[(OH2|(Si,Al)4O10].Mg0.35(H2O)4, water-containing sulfates Ca[SO4].2H2O, colloidal silica, minerals or mixtures thereof. FGD gypsum, kaolin or wollastonite is particularly preferably used. The clay minerals act as a filler and promote ceramization.

The polymer B) is water-soluble and is used in the form of an aqueous solution, preferably in a concentration of at least 50 g/l, in particular at least 100 g/l. A preferably used polymer B) is an aminofunctionalized polymer, in particular a polyvinylamine.

Preferred blowing agents C) are volatile organic compounds, such as, for example, hydrocarbons, halogenated hydrocarbons, alcohols, ethers, ketones and esters. Particularly preferred are $C_4$-$C_8$-hydrocarbons, in particular butane, pentane or hexane. The blowing agents are preferably used in amounts of from 1 to 40% by weight, in particular 5 to 25% by weight, based on the solids.

The addition of an emulsifier or of an emulsifier mixture D) is required for emulsifying the blowing agent and for stabilizing the foam. Anionic, cationic, nonionic or amphoteric surfactants can be used as emulsifier D).

Suitable anionic surfactants are diphenylene oxide sulfonates, alkanesulfonates and alkylbenzenesulfonates, alkylnaphthalenesulfonates, olefinsulfonates, alkyl ether sulfonates, alkylsulfates, alkyl ether sulfates, alpha-sulfo fatty acid esters, acylamino-alkanesulfonates, acyl isethionates, alkyl ether carboxylates, N-acylsarcosinates, alkyl and alkyl ether phosphates. Alkylphenol polyglycol ethers, fatty alcohol polyglycol ethers, fatty acid polyglycol ethers, fatty acid alkanolamides, EO/PO block copolymers, amine oxides, glycerol fatty acid esters, sorbitan esters and alkylpolyglucosides can be used as nonionic surfactants. Alkyltriammonium salts, alkylbenzyldimethylammonium salts and alkylpyridinium salts are used as cationic surfactants. The emulsifiers are preferably added in amounts of from 0.1 to 5% by weight, based on the $SiO_2$ particles.

Suitable crosslinking agents E) are all compounds reactive with the water-soluble polymer B). The water-soluble polymer B) and the crosslinking agent E) are preferably selected so that the duration of reaction at the foaming temperature up to the complete conversion is in the range from 1 to 30 seconds.

Aldehydes, isocyanates, epoxides, acrylates, acrylamides, esters, divinyl sulfonates, particularly preferably ethanedial, are preferably used as crosslinking agent E).

For good fire protection, the proportion of organic constituents in the inorganic-organic hybrid foam should be as low as possible. Foams in which the proportion of organic constituents is so low that they pass the fire test A2 according to DIN 4102 and have a fire resistance F30 are preferred. The sum of the proportions of solid of water-soluble polymer B) and of crosslinking agent E) is therefore preferably in the range from 1 to 15% by weight, particularly preferably in the range from 2 to 8% by weight, based on the foam. The foams according to the invention emit no fumes and show no shrinkage in the event of a fire.

The mixture to be foamed may furthermore comprise customary additives, such as, for example, pigments and fillers. For example, metal oxides, for example of iron, copper, chromium, manganese, cobalt, nickel, selenium or other rare earth metals, may be used for staining the silicate structure. For improving the thermal insulation effect, IR absorbers and/or reflectors, e.g. cerium compounds, may be added. The addition of boron oxide, borates, phosphates or aluminum oxides can be effected for optimizing the thermal, electrical or mechanical properties of the clay mineral skeleton.

For better foamability, viscosity-increasing additives, e.g. starch, modified celluloses or polyvinyl alcohol, may be added.

The blowing agent is dispersed in the mixture in stage (b) preferably at temperatures below 50° C., particularly preferably at temperatures in the range from 10 to 30° C.

The foaming of the mixture obtained from stage (c) can be effected in stage (d) by warming to a temperature in the range from 35 to 100° C., preferably in the range from 60 to 90° C. The warming or heating can be carried out by customary methods, for example with a heating element, hot air or microwaves. Microwaves are preferred because they permit particularly homogeneous and rapid warming or heating.

In another embodiment, the mixture is foamed in stage (d) by depressurization. This results in expansion of blowing agent, and a solid foam likewise forms. The pressure reduction also comprises letting down the mixture under a pressure P1 through a nozzle to a pressure P2<P1, where P1>1 bar. In this embodiment, warming for the purpose of foaming is not absolutely essential.

For improving the mechanical stability, the foam can be treated with a solution of alkoxysilanes.

For increasing the mechanical stability, the foam can be dried after stage (d) at from 100 to 140° C. and, in a subsequent stage (e), can be sintered at a temperature above 500° C., preferably in the range of 550-800° C. Owing to the use of the water-soluble polymer B) and of the crosslinking agent E) as organic components, the foam obtained need not necessarily be sintered.

After stage (e), the resilient inorganic foam obtained can be impregnated with a size customary for glass fibers, for example silanes. This aftertreatment can lead to an improvement in the mechanical stability by reducing the susceptibility to notched impact. Impregnation can also be carried out with an increased concentration of the crosslinking agent. The postcrosslinking can increase the mechanical stability and reduce the swellability.

An aftertreatment can also be used for imparting a water repellency to the foam. Hydrophobic coating materials which have high thermal stability and low combustibility, for example silicones, siliconates or fluorinated compounds, are preferably used here.

The process described gives foam slabs or sheets which can be cut to size to give any desired shapes.

The density of the foam is as a rule from 10 to 1000 kg/m$^3$, preferably less than 100 kg/m$^3$, particularly preferably in the range from 5 to 50 kg/m$^3$.

The foam obtainable by the process according to the invention preferably has an open-cell structure with a proportion of open cells, measured according to DIN ISO 4590, of more than 50%, in particular more than 80%.

The mean pore diameter is preferably in the range from 10 to 1000 μm, in particular in the range from 50 to 500 μm.

The foam according to the invention is distinguished by high resilience, an elongation at break of more than 5%, a transverse tensile strength of more than 50%, fulfils the fire test A2 and shows a fire resistance F30.

The foam obtainable by the process according to the invention can be used in a variety of ways for heat and sound insulation in the building industry and in automotive construction, for example for heat insulation in house building or as sound-insulating material, for example in the engine space, in automobiles, aircraft, railways, ships, etc. Preferred fields of use are in areas which require high thermal stability and low flammability, for example in porous burners. The material is also suitable for insulation in the environment of strong radiation which destroys organic materials in the long term, for example in nuclear power stations.

Furthermore, the foam obtainable by the process according to the invention is also suitable in applications in which open-cell aminoplast foams are used, for example for fireproof textiles, upholstery, mattresses, filters and catalyst supports. It has a low-temperature resilience comparable with open-cell aminoplast foams. As polishing material, it is distinguished by greater hardness and abrasiveness for very hard surfaces.

EXAMPLES

Clay minerals used:
FGD Gypsum:
Kaolin:

Example 1

5 g of HD cement, 37.5 g of an aqueous polyvinyl alcohol solution (Mowiol 4/98), 37.5 g of an aqueous polymer solution based on vinylamine and N-vinylformamide (solids content 10% by weight) and 15 g of an aqueous starch solution (solids content 10% by weight) were added to 85 g of FGD gypsum. Thereafter, 1.5 g of a nonionic surfactant based on alkylpolyglucoside were dissolved and 20 g of pentane were dispersed by thorough stirring. 0.06 g of ethanedial was then added. Warming in a drying oven to about 80° C. gave a foam slab. After subsequent drying at 100° C., the resilient foam had a density of 40 g/l and showed a high mechanical strength and elongation at break.

Example 2

10 g of an aqueous polyvinyl alcohol solution (Mowiol 4/98), 20 g of an aqueous polymer solution based on vinylamine and N-vinylformamide (solids content 10% by weight) were added to 30 g of FGD gypsum. Thereafter, 0.5 g of a nonionic surfactant based on alkylpolyglucoside were dissolved and 5 g of pentane were dispersed by thorough stirring. 0.02 g of ethanedial was then added. Warming in a drying oven to about 80° C. gave a foam slab. After subsequent drying at 100° C., the resilient foam had a density of 30 g/l and showed a high mechanical strength and elongation at break.

Example 3

30 g of an aqueous polymer solution based on vinylamine and N-vinylformamide (solids content 10% by weight) were added to 30 g of FGD gypsum. Thereafter, 0.5 g of a nonionic surfactant based on polyalkylene oxide methylsiloxane copolymer were dissolved and 5 g of pentane were dispersed by thorough stirring. 0.04 g of ethanedial was then added. Warming in a drying oven to about 80° C. gave a foam slab. After subsequent drying at 100° C., the resilient foam had a density of 30 g/l and showed a high mechanical strength and elongation at break.

Example 4

30 g of an aqueous polymer solution based on vinylamine and N-vinylformamide (solids content 10% by weight) were added to 27.5 g of kaolin. Thereafter, 0.5 g of a nonionic surfactant based on alkylpolyglucoside were dissolved and 5 g of pentane were dispersed by thorough stirring. 0.04 g of ethanedial was then added. Warming in a drying oven to about 80° C. gave a foam slab. After subsequent drying at 100° C., the resilient foam had a density of 30 g/l and showed a high mechanical strength and elongation at break.

We claim:
1. A process for the production of a foam which comprises foaming a mixture, comprising
   from 50 to 97% by weight of a mineral A), selected from the group consisting of FGD, gypsum, kaolin and wollastonite,
   from 1 to 45% by weight of a polyvinylamine B) dissolved in water
   from 1 to 50% by weight of a blowing agent C)
   from 1 to 5% by weight of an emulsifier D)
   from 0 to 5% by weight of a crosslinking agent E) reactive with the polyvinylamine B),
   the percentages by weight of the components A) and B) being based on solid and the sum of A) to E) does not exceed 100% by weight.
2. The process according to claim 1, wherein the process comprises the following stages:
   (a) preparing a suspension from the mineral A) and the aqueous solution of the polyvinylamine B),
   (b) adding a blowing agent C) and of an emulsifier D) and dispersing of the blowing agent,
   (c) adding a crosslinking agent E) reactive with the polyvinylamine B), and
   (d) foaming the mixture obtained after stage (c) by warming to a temperature in the range from 35 to 100° C. or by depressurization.
3. The process according to claim 1, wherein emulsifier D) used is an alkylpolyglucoside, alkyl ether sulfate or alkyl ether phosphate.
4. The process according to claim 1, wherein blowing agent C) used is a $C_4$-$C_8$-hydrocarbon.
5. The process according to claim 1, wherein crosslinking agent E) used is a dialdehyde.
6. The process according to claim 1, wherein starch or modified cellulose is added to the suspension of mineral A) and of the aqueous solution of the polyvinylamine B).
7. The process according to claim 1, wherein the sum of the proportions of solid of polyvinylamine B) and of crosslinking agent E) is in the range from 1 to 30% by weight, based on the foam.
8. The process according to claim 2, wherein emulsifier D) used is an alkylpolyglucoside, alkyl ether sulfate or alkyl ether phosphate.
9. The process according to claim 8, wherein blowing agent C) used is a $C_4$-$C_8$-hydrocarbon.
10. The process according to claim 9, wherein crosslinking agent E) used is a dialdehyde.
11. The process according to claim 10, wherein starch or modified cellulose is added to the suspension of mineral A) and of the aqueous solution of the polyvinylamine B).
12. The process according to claim 11, wherein the sum of the proportions of solid of polyvinylamine B) and of crosslinking agent E) is in the range from 1 to 30% by weight, based on the foam.
13. A foam obtainable by the process according to claim 1.
14. A foam obtained by the process according to claim 12.
15. The foam according to claim 13, wherein the foam has a density of less than 50 kg/m3.

16. The foam according to claim 13, wherein the foam has a proportion of open cells according to DIN ISO 4589 of more than 50%.

17. The foam according to claim 15, wherein the foam has a proportion of open cells according to DIN ISO 4589 of more than 50%.

* * * * *